(12) United States Patent
Nishikawa et al.

(10) Patent No.: US 12,430,334 B2
(45) Date of Patent: Sep. 30, 2025

(54) DATABASE MANAGEMENT APPARATUS AND METHOD

(71) Applicants: Hitachi, Ltd., Tokyo (JP); The University of Tokyo, Tokyo (JP)

(72) Inventors: Norifumi Nishikawa, Tokyo (JP); Shinji Fujiwara, Tokyo (JP); Mayuko Ozawa, Tokyo (JP); Kazuhiko Mogi, Tokyo (JP); Kazuo Goda, Tokyo (JP); Yuto Hayamizu, Tokyo (JP)

(73) Assignees: HITACHI, LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 127 days.

(21) Appl. No.: 18/369,923

(22) Filed: Sep. 19, 2023

(65) Prior Publication Data

US 2024/0303239 A1 Sep. 12, 2024

(30) Foreign Application Priority Data

Mar. 7, 2023 (JP) ................................. 2023-034882

(51) Int. Cl.
    *G06F 16/2453* (2019.01)
(52) U.S. Cl.
    CPC ............................. *G06F 16/24544* (2019.01)
(58) Field of Classification Search
    None
    See application file for complete search history.

(56) References Cited

U.S. PATENT DOCUMENTS

| | | | | |
|---|---|---|---|---|
| 5,241,648 A | * | 8/1993 | Cheng | G06F 16/2456 715/255 |
| 5,742,806 A | * | 4/1998 | Reiner | G06F 16/24532 711/216 |
| 6,185,557 B1 | * | 2/2001 | Liu | G06F 16/2456 707/999.005 |
| 10,810,201 B2 | | 10/2020 | Beavin et al. | |
| 2012/0317094 A1 | * | 12/2012 | Bear | G06F 16/24542 707/E17.017 |

(Continued)

OTHER PUBLICATIONS

Srikanth Kandula, et al., "Pushing Data Induced Predicates Through Joins in Big-Data Clusters", Proceedings of the VLDB Endowment, vol. 13, No. 3, 2004, ISSN 21508097. https://doi.org/10.14778/3368289.3368292.

(Continued)

*Primary Examiner* — Yu Zhao

(74) *Attorney, Agent, or Firm* — Mattingly & Malur, PC

(57) ABSTRACT

The scanning range of an inner table can be limited in the join processing irrespective of the existence of search conditions or a partition key, and the performance of the join processing can be improved. There is a column range index representing a range of values stored in a table. When a join result of a current stage is an outer table related to a join of a next stage in a join of each stage of the join processing, a database management apparatus identifies whether there is a possibility that an inner table related to a join of a next stage includes a hit record in an inner table related to a join of a current stage based on a column range index corresponding to a join column of a current stage and a column range index corresponding to a join column of a next stage.

11 Claims, 12 Drawing Sheets

(56) References Cited

U.S. PATENT DOCUMENTS

| | | | | |
|---|---|---|---|---|
| 2015/0261818 A1* | 9/2015 | Attaluri | ............... | G06F 16/2456 |
| | | | | 707/714 |
| 2015/0339350 A1* | 11/2015 | Baggett | ............... | G06F 16/2456 |
| | | | | 707/714 |
| 2016/0098451 A1* | 4/2016 | Dickie | ................ | G06F 16/2465 |
| | | | | 707/718 |
| 2016/0335321 A1* | 11/2016 | Yoshida | ............ | G06F 16/24545 |
| 2024/0078237 A1* | 3/2024 | Ma | .................... | G06F 16/24544 |

OTHER PUBLICATIONS

Shinsuke Sugie, "Bloom Filter algorithm for SQL execution", Future Technology Blog, Oct. 31, 2016., https://future-architect.github.io/articles/20161031/.

Ali Afroozeh, et al., "Faster SQL Queries on Delta Lake with Dynamic File Pruning", Engineering Blog, Apr. 30, 2020., https://www.databricks.com/blog./2020/04/30/faster-sql-queries-on-delta-lake-with-dynamic-file-pruning.html.

\* cited by examiner

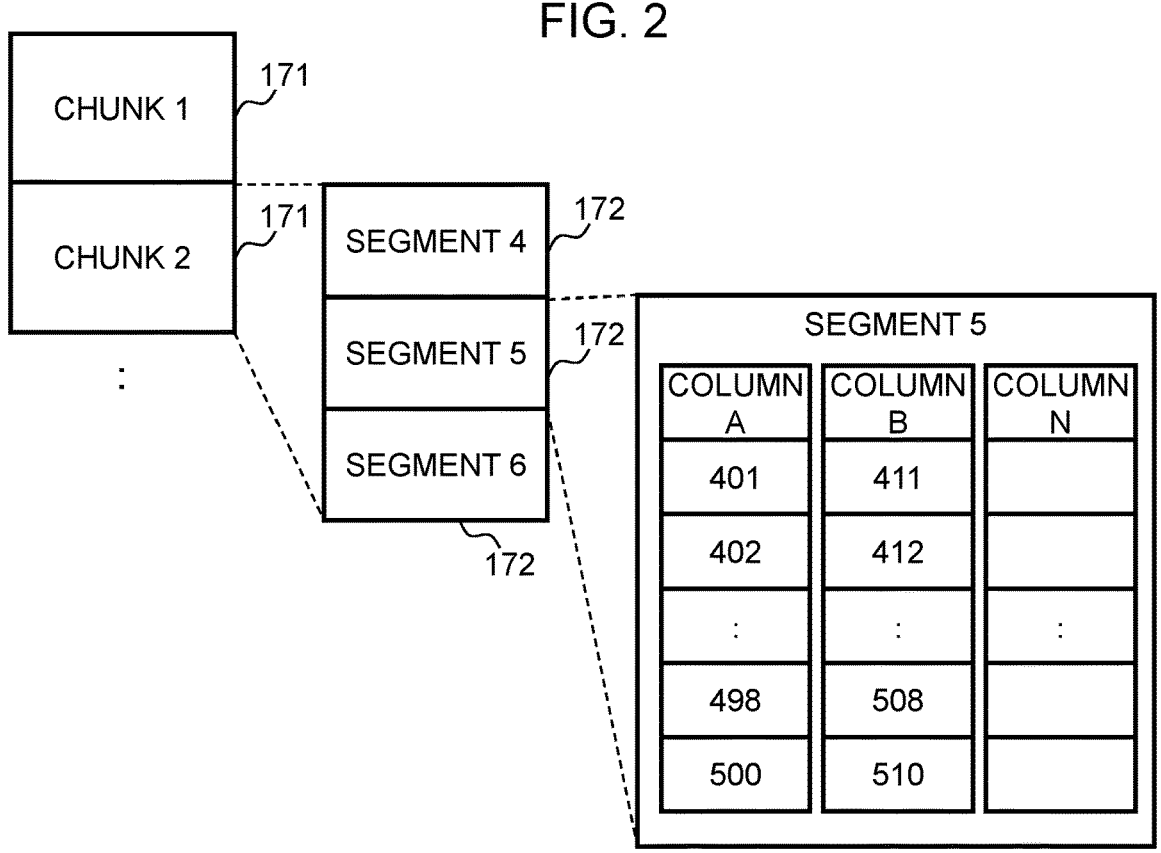

FIG. 6A

WHEN THE NUMBER OF SEGMENTS IS SMALL
COLUMN A RANGE INDEX

|           | min | max |
|-----------|-----|-----|
| CHUNK 1   | 1   | 300 |
| SEGMENT 1 | 1   | 100 |
| :         | :   | :   |

|           | min | max |
|-----------|-----|-----|
| CHUNK 2   | 301 | 600 |
| SEGMENT 4 | 301 | 400 |
| SEGMENT 5 | 401 | 500 |
| SEGMENT 6 | 501 | 600 |

⇒ USE SEGMENT AS FILTER

FIG. 6B

WHEN THE NUMBER OF SEGMENTS IS MEDIUM
COLUMN A RANGE INDEX

|           | min | max |
|-----------|-----|-----|
| CHUNK 1   | 1   | 300 |
| SEGMENT 1 | 1   | 100 |
| :         | :   | :   |

|           | min | max |
|-----------|-----|-----|
| CHUNK 2   | 301 | 600 |
| SEGMENT 4 | 301 | 400 |
| SEGMENT 5 | 401 | 500 |
| SEGMENT 6 | 501 | 600 |

⇒ USE CHUNK AS FILTER

FIG. 6C

WHEN THE NUMBER OF SEGMENTS IS LARGE
COLUMN A RANGE INDEX

|           | min | max |
|-----------|-----|-----|
| CHUNK 1   | 1   | 300 |
| SEGMENT 1 | 1   | 100 |
| :         | :   | :   |

|           | min | max |
|-----------|-----|-----|
| CHUNK 2   | 301 | 600 |
| SEGMENT 4 | 301 | 400 |
| SEGMENT 5 | 401 | 500 |
| SEGMENT 6 | 501 | 600 |

⇒ DO NOT USE FILTER

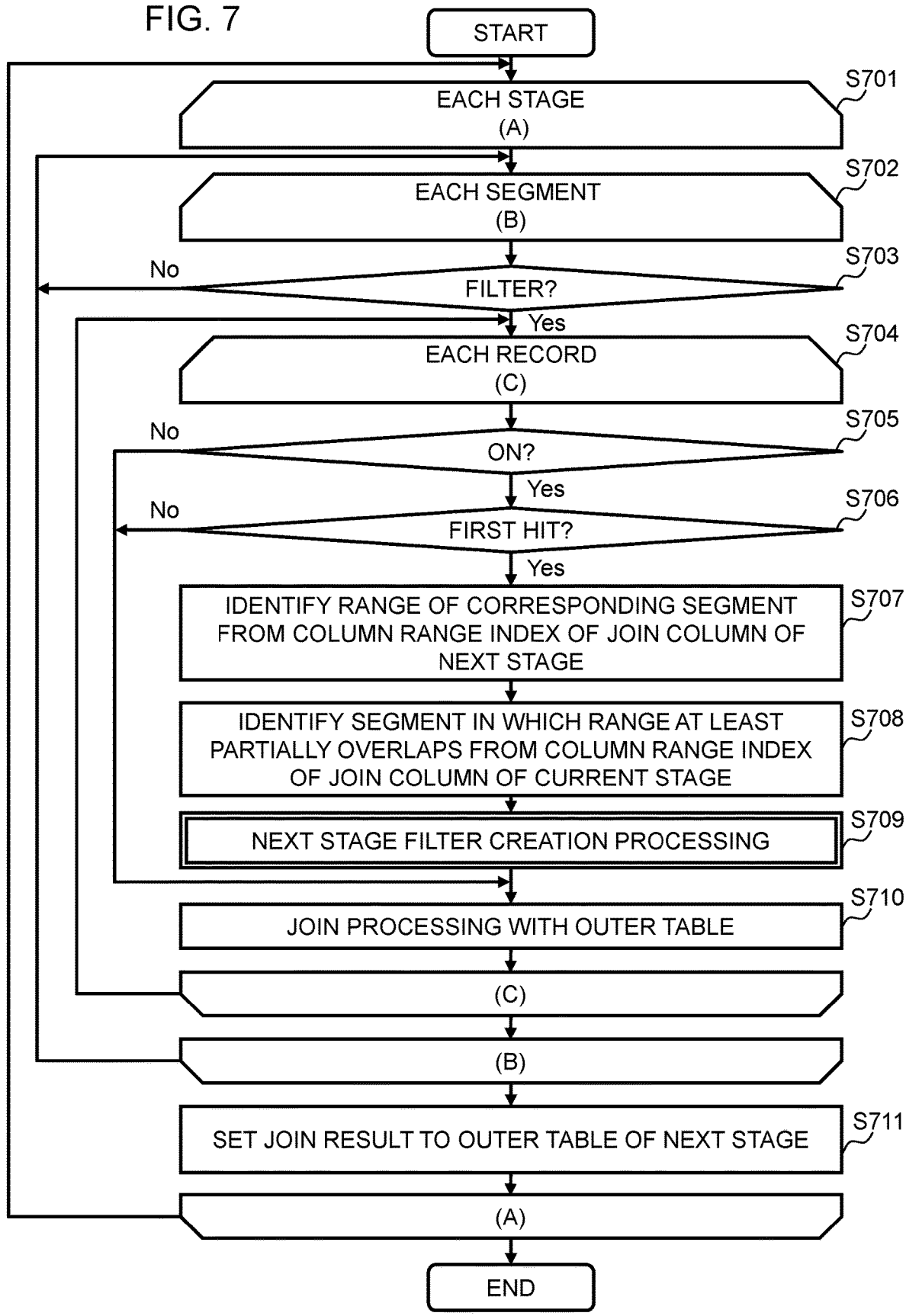

DATABASE MANAGEMENT APPARATUS AND METHOD

CROSS-REFERENCE TO PRIOR APPLICATION

This application relates to and claims the benefit of priority from Japanese Patent Application number 2023-034882, filed on Mar. 7, 2023 the entire disclosure of which is incorporated herein by reference.

BACKGROUND

The present invention generally relates to a database management, and particularly relates to a join of tables of a database.

In relation to a join of an outer table and an inner table, for example, known are the technologies disclosed in PTL 1 and NPTL 1 to NPTL 3. All literature of PTL 1 and NPTL 1 to NPTL 3 disclose a method of limiting the scanning range of an inner table.

Specifically, for example, PTL 1 and NPTL 3 disclose a method of limiting the scanning range of an inner table using a record set of an outer table. NPTL 2 discloses a method of limiting the scanning range using the search conditions assigned to a join column of an outer table. NPTL 3 discloses a method of limiting the scanning range using a bloom filter.

[PTL 1] U.S. Pat. No. 10,810,201
[NPTL 1] Written by Srikanth Kandula et al., "Pushing Data-Induced Predicates Through Joins in Big-Data Clusters", VLDB2004
[NPTL 2] Written by Shinsuke Sugie, "Bloom Filter Algorithm upon SQL Execution", Oct. 31, 2016 (future-architect.github.io/articles/20161031/)
[NPTL 3] Written by Ali Afroozeh et al., "Faster SQL Queries on Delta Lake with Dynamic File Pruning", Apr. 30, 2020 (databricks.com/blog/2020/04/30/faster-sql-queries-on-delta-lake-with-dynamic-file-pruning.html)

SUMMARY

According to PTL 1 and NPTL 3, since the range of the inner table needs to be searched for each record, the processing performance of the join will consequently deteriorate.

According to NPTL 1, the scanning range of the inner table cannot be limited if search conditions are not assigned.

According to NPTL 2, the scanning range of the inner table cannot be limited unless the join is a join using a partition key. Moreover, according to NPTL 2, since the corresponding partition needs to be searched for each record, the processing performance of the join will consequently deteriorate.

A database management apparatus performs query processing as processing in response to a query of a database stored in a storage apparatus. When the query processing is processing in which join processing including a join of multiple stages is performed and when a join result of a current stage is an outer table related to a join of a next stage in a join of each stage of the join processing, the database management apparatus performs filter creation processing, and scans only a range represented with a filter (which is data representing a scanning range of an inner table) created in the filter creation processing within an inner table related to the join of the next stage. The storage apparatus stores a column range index as data representing a range of values stored in a table. The filter creation processing identifies whether there is a possibility that an inner table related to a join of a next stage includes a hit record in an inner table related to a join of a current stage based on a column range index corresponding to a join column of a current stage and a column range index corresponding to a join column of a next stage.

According to the present invention, the scanning range of an inner table can be limited in the join processing irrespective of the existence of search conditions or a partition key, and the performance of the join processing can be improved.

BRIEF DESCRIPTION OF DRAWINGS

FIG. 2 shows a configuration of the table in the database.
FIG. 3 shows a configuration of the column range index.
FIG. 6A shows an example of a case where the scan unit is a segment.
FIG. 6B shows an example of a case where the scan unit is a chunk.
FIG. 6C shows a case (no filter creation) where the scan unit is an overall inner table.
FIG. 7 shows a flow of the query processing according to the first embodiment.

DESCRIPTION OF EMBODIMENTS

Figure 1:
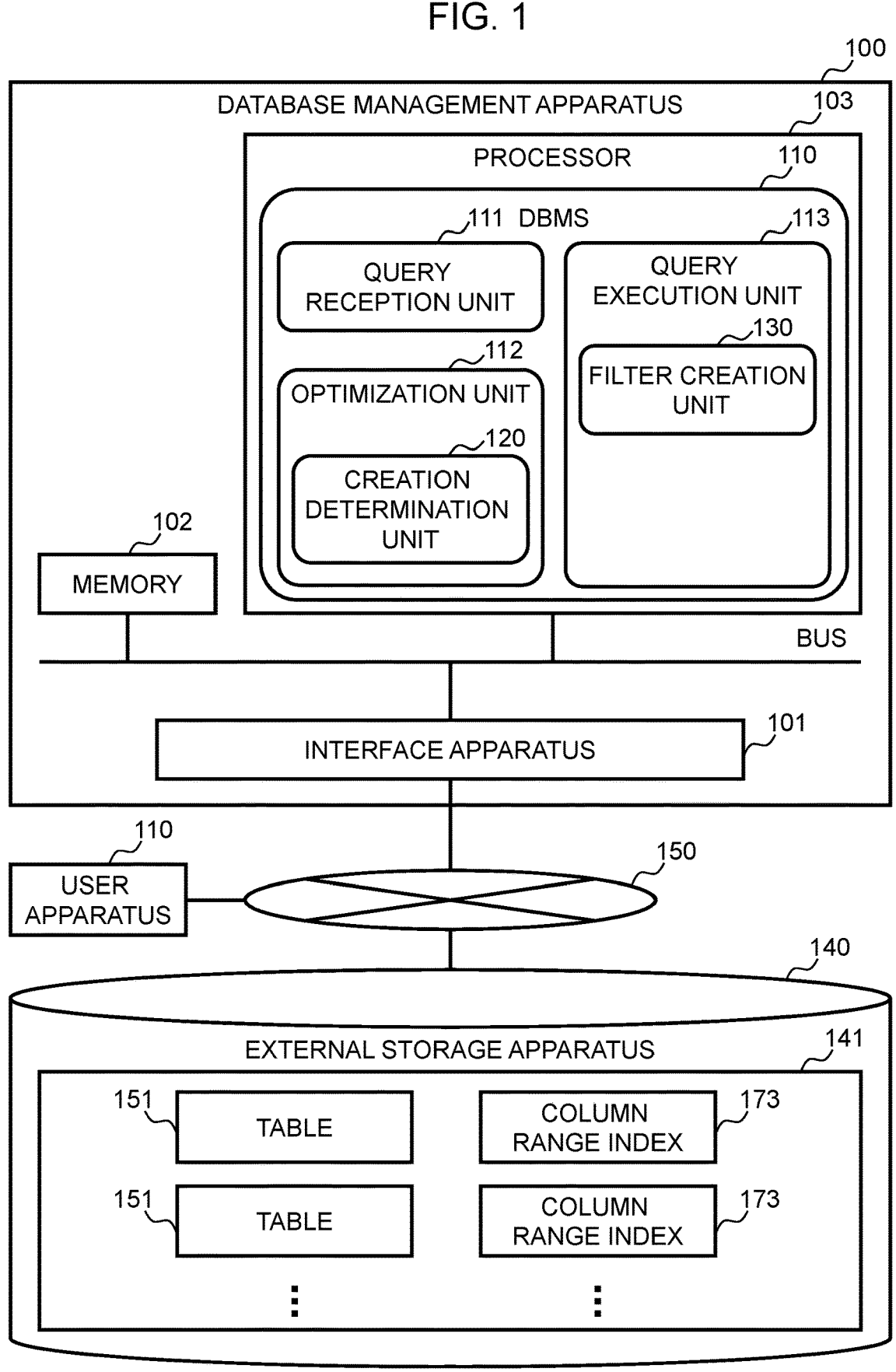
FIG. 1 shows a configuration of the overall system including the database management apparatus according to the first embodiment.

In the following explanation, "interface apparatus" may be one or more interface devices. The one or more interface devices may be at least one of the following.

One or more I/O (input/Output) interface devices. An I/O (input/Output) interface device is an interface device to at least one of either an I/O device or a remote display computer. An I/O interface device to a display computer may be a communication interface device. At least one I/O device may be a user interface device, for example, one of either an input device such as a keyboard or a pointing device, or an output device such as a display device.

One or more communication interface devices. One or more communication interface devices may be one or more same type of communication interface devices (for example, one or more NICs (Network Interface Cards)) or two or more different types of communication interface devices (for example, an NIC and an HBA (Host Bus Adapter)).

Moreover, in the following explanation, "memory" is one or more memory devices as an example of one or more storage devices, and is typically a primary storage device. At least one memory device in a memory may be a volatile memory device or a nonvolatile memory device.

Moreover, in the following explanation, "persistent storage device" may be one or more persistent storage devices as an example of one or more storage devices. A persistent storage device is typically a non-volatile storage device (for example, auxiliary storage device), and is specifically, for example, an HDD (Hard Disk Drive), an SSD (Solid State Drive) or an NVMe (Non-Volatile Memory Express) drive.

Moreover, in the following explanation, "processor" is one or more processor devices. While at least one processor device is typically a microprocessor device such as a CPU (Central Processing Unit), it may also be another type of processor device such as a GPU (Graphics Processing Unit). At least one processor device may be a single-core processor device or a multi-core processor device. At least one processor device may be a processor core. At least one processor device may be a processor device in a broad sense such as a hardware circuit (for example, FPGA (Field-Programmable Gate Array), CPLD (Complex Programmable Logic Device) or ASIC (Application Specific Integrated Circuit)) which performs a part or all of the processing.

Moreover, in the following explanation, while a function may be explained using an expression such as "yyy unit", the function may be realized by one or more computer programs being executed with a processor, or realized by one or more hardware circuits (for example, FPGA or ASIC), or realized based on a combination thereof. When a function is realized by a program being executed with a processor, since predetermined processing will be performed using a storage device and/or an interface device as appropriate, the function may also be at least a part of the processor. Processing explained with a function as the subject may be processing performed by a processor or a device including such processor. A program may be installed from a program source. A program source may be, for example, a storage medium (for example, non-temporary storage medium) readable with a program distribution computer or a computer. The explanation of each function is an example, and a plurality of functions may be consolidated into one function, or one function may be divided into a plurality of functions.

Moreover, in the following explanation, when explaining similar elements without differentiation, the common character among the reference characters will be used, and when differentiating and explaining similar elements, the reference characters (or identification numbers of the elements) may be used.

The present invention realizes the limitation of the scanning range of an inner table in the join processing. In the present specification, the join processing includes a join of multiple stages such as recursive join processing or multistage join processing, and is a join in which the outer table in the join of the next stage is a table based on the result of the joint of the previous stage. Several embodiments of the present invention are now explained.

First Embodiment

FIG. 1 shows a configuration of the overall system including the database management apparatus according to the first embodiment.

A database management apparatus 100 comprises an interface apparatus 101, a memory 102 and a processor 103.

The interface apparatus 101 is connected to a communication network (for example, Internet) 150. The interface apparatus 101 communicates with a user apparatus 110 and an external storage apparatus 140 via the communication network 150. The user apparatus 110 may be a physical computer such as a personal computer, or a virtual computer based on a physical computer. Moreover, the interface apparatus 101 may be connected to an I/O device as a user interface device in substitute for or in addition to the user apparatus 110. In other words, the database management apparatus 100 may perform the input and output of information to and from the user apparatus 110 and/or the I/O device. Moreover, the communication network to which the database management apparatus 100 and the user apparatus 110 are connected and the communication network to which the database management apparatus 100 and the external storage apparatus 140 are connected may be different.

The external storage apparatus 140 may be a persistent storage apparatus, or an apparatus including a persistent storage apparatus, or an online storage. The external storage apparatus 140 stores a database 141. The database 141 includes one or more tables 151 and one or more column range indexes 173. A column range index 173 exists for each join column in the table 151, and is an index data representing a range of the column. The database 141 may also be an in-memory database. A "join column" is a column used for a join (column to be subject to a join).

The memory 102 stores one or more computer programs. A DBMS (DataBase Management System) 110 is realized by these programs being executed by the processor 103. The DBMS 110 has functions such as a query reception unit 111, an optimization unit 112 and a query execution unit 113.

The query reception unit 111 receives a query to the database 141 from the user apparatus 110. A query is described, for instance, using SQL (Structured Query Language). The user apparatus 110 may be an example of a query source. A query source may be an external apparatus of the database management apparatus 100 as with the user apparatus 110, or an internal element of the database management apparatus 100 (for example, application that is realized by the processor 103 executing a computer program in the memory).

The optimization unit 112 may create a query plan required for executing a query based on the query received by the query reception unit 111. The query plan may be, for example, information including one or more database operators and a relation of the execution sequence of the database operators. A query plan may be represented, for example, as a tree structure in which the database operator is a node, and the relation of the execution sequence of the database operators is an edge.

The optimization unit 112 includes a creation determination unit 120. The creation determination unit 120 determines whether filter creation is required. The creation determination unit 120 turns "ON" a scan creation flag when it determines that filter creation is required. A "scan creation flag" is an example of data representing whether scan creation is required and is stored, for example, in the memory 102. A "filter" is data representing a scanning range of an inner table that is scanned in a join. Note that the creation determination unit 120 may also be provided outside the optimization unit 112.

The query execution unit 113 executes a query based on the created query plan and returns an execution result of the query to the user apparatus 110. In executing the query, by creating a task for executing the database operator and executing the created task, the query execution unit 113 can issue a read request (or write request) of data required for the database operator corresponding to that task. The query execution unit 113 may also execute a plurality of database operators with one task. A task may be implemented, for example, based on a process or kernel thread realized with an OS (Operating System) not shown, or by using a user thread realized with a library or the like.

The query execution unit 113 includes a filter creation unit 130. The filter creation unit 130 creates a filter. The filter creation unit 130 creates a filter when the scan creation flag is "ON". Note that the filter creation unit 130 may be provided outside the query execution unit 113.

FIG. 2 shows a configuration of the table 151 in the database 141.

The table 151 generally includes a plurality of records and a plurality of columns. In this embodiment, the table 151 is configured from a plurality of chunks 171. A chunk 171 is configured from a plurality of segments 172. A segment 172 is a unit that is larger than a record, is configured from some records (two or more records) of the table 151, and includes a plurality of columns (specifically, for example, a part of each column) of the table 151.

Note that the division of the table 151 is not limited to the example shown in FIG. 2. For example, a hierarchy in which the chunk 171 is larger than the segment 172 is not required. Moreover, a part of a plurality of segments 172 may include a part of a plurality of columns, and another part of a plurality of segments 172 may include another part of a plurality of columns (provided that, at least in the first embodiment, a join column of a current stage and a join column of a next stage need to exist in the same segment 172). Moreover, in this embodiment, while the size of the chunk 171 and the size of the segment 172 are uniform, the size of the chunk 171 and/or the size of the segment 172 does not have to be uniform. Moreover, the number of segments 172 in the chunk 171 does not need to be uniform.

FIG. 3 shows a configuration of the column range index 173.

As described above, the column range index 173 exists for each join column of the table 151. The column range index 173 relates to a corresponding column (column corresponding to the column range index 173), and represents a range of the values of that column, such as the minimum value and the maximum value.

More specifically, the column range index 173 includes a sub index 300 for each chunk 171 regarding the corresponding column. The sub index 300 represents, regarding the response chunk (chunk corresponding to the sub index 300) 171, a range of the corresponding column in the corresponding segment 172 for each segment 172 of the response chunk 171. Moreover, the sub index 300 represents, regarding the response chunk 171, a range of the corresponding column in the response chunk 171.

Note that, in this embodiment, a value in a column is a numerical value, and the size of the value is the size of the numerical value, but when a value in a column is a value other than a numerical value, the size of the value may be pursuant to a definition predetermined according to the type of value. For example, when values are configured from alphabets, "a" at the beginning of the alphabet may be the minimum value, and "z" at the end of the alphabet may be the maximum value.

In the first embodiment, the join processing is the recursive join processing that is performed according to a recursive query.

Figure 4:
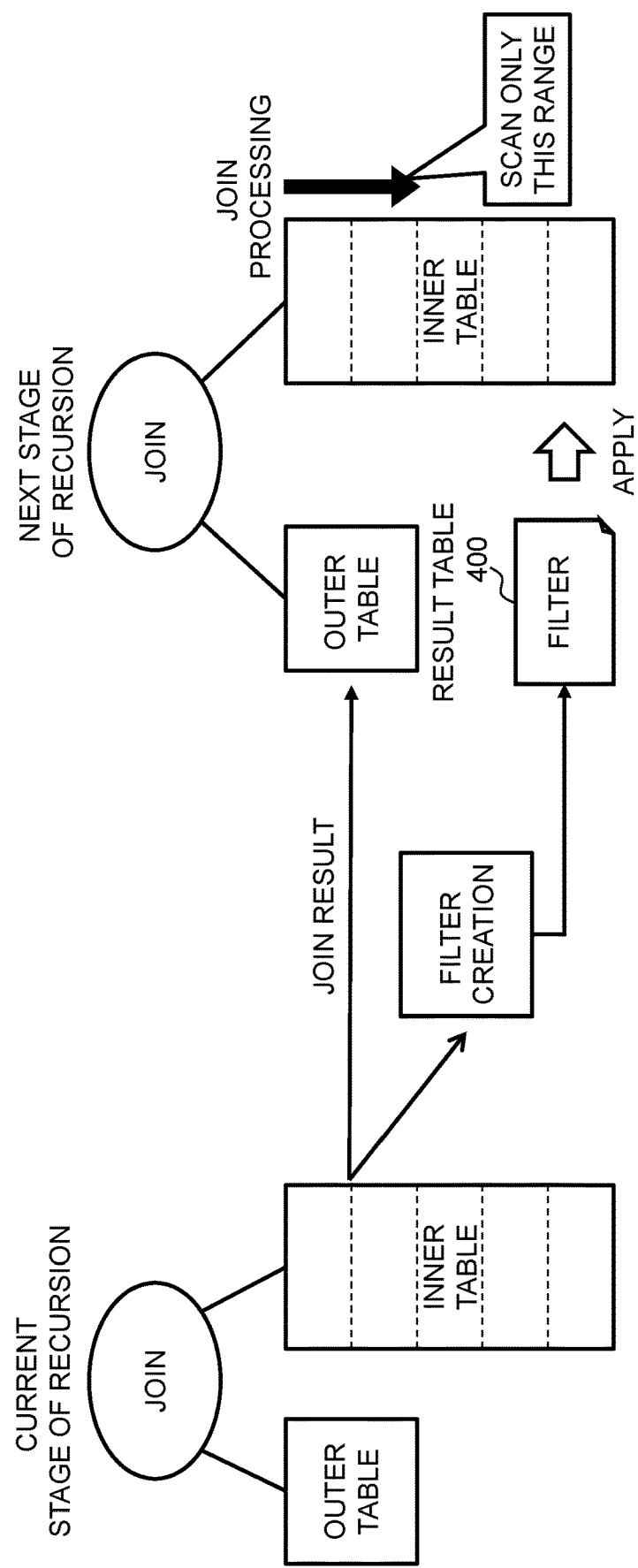
FIG. 4 shows an example of the recursive join processing.

FIG. 4 shows an example of the recursive join processing.

The filter creation unit 130 creates a filter 400, in a join of an outer table (Left) and an inner table (Right), representing an inner table scanning range in a join of a next stage. In a join of a next stage, a table as a result of a join of a previous stage is the outer table. The query execution unit 113 scans, in a join of an outer table and an inner table (join of a next stage), only a range represented with the filter 400 in an inner table.

Figure 5:
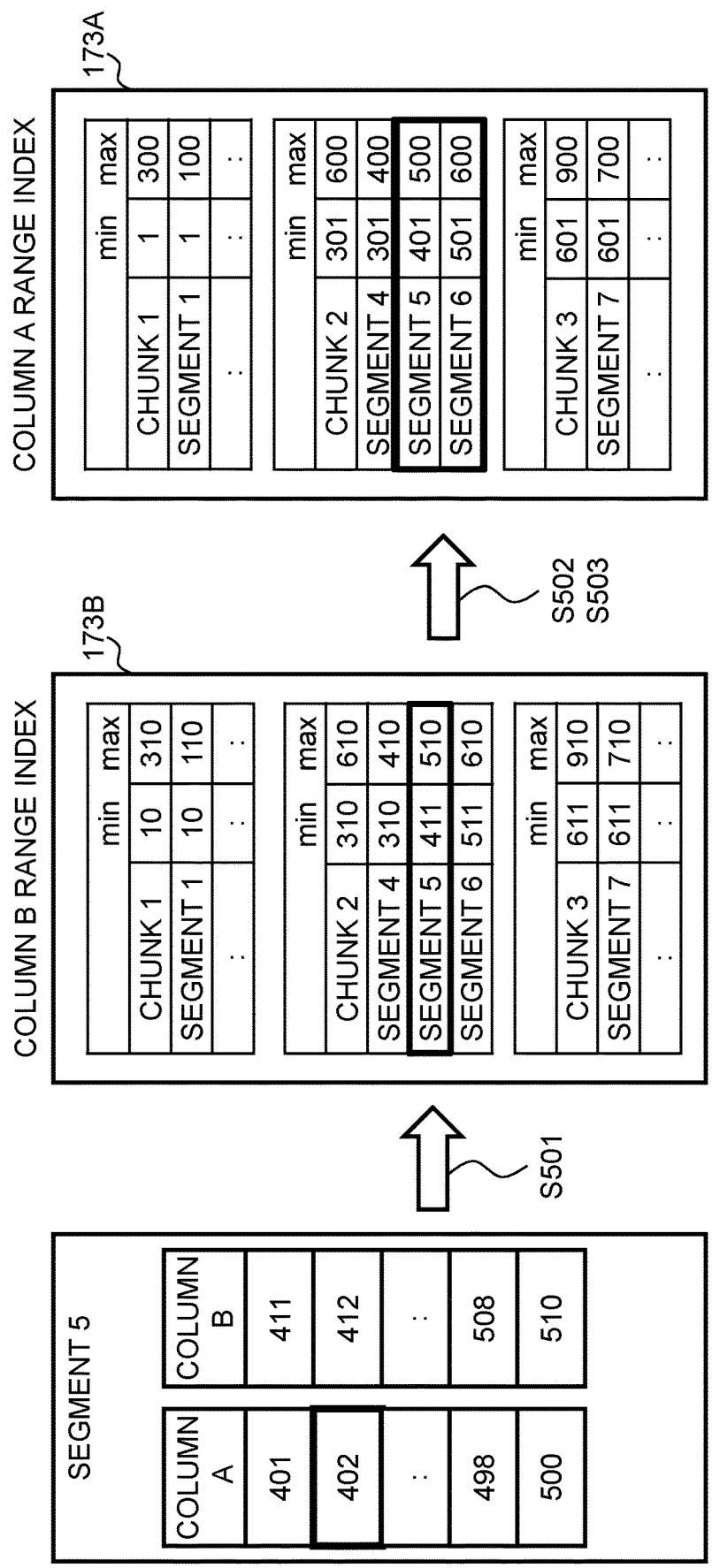
FIG. 5 shows an example of the filter creation in the recursive join processing.

FIG. 5 shows an example of the filter creation in the recursive join processing.

The segment 172 includes both a join column of a current stage and a join column of a next stage. The column range index 173 exists for each of a join column of a current stage and a join column of a next stage. Let it be assumed that a plurality of columns (column A, column B, column C, . . . ) exist. In FIG. 5, the column A is indicated as a join column of a current stage, the column B is indicated as a join column of a next stage and, therefore, a column range index 173A of the column A and a column range index 173B of the column B are shown. When the recursive join processing is further advanced (when advancing to a join of a next stage), a column corresponding to a join column of a current stage and a column corresponding to a column of a next stage may each be shifted. Specifically, in a join of a next stage, the column B may correspond to a join column of a current stage and the column C may correspond to a join column of a next stage. In the recursive join processing, a join is recursively performed until an outer table as a join result can no longer be obtained.

In the example shown in FIG. 5, the filter creation unit 130 performs the following processing.

(S501) When there is a hit record (record that satisfies the condition described in the query) in an inner table scan related to a join column A of a current stage, the filter creation unit 130 identifies a range (minimum value and maximum value) of a join column B of a next stage from the column range index 173B corresponding to the join column B of a next stage regarding the segment 172 including the hit record. According to the example shown in FIG. 5, the "segment 172 including the hit record" is segment 5, and, in a "range of the join column B of a next stage", the minimum value is "411" and the maximum value is "510". When a hit record exists in each of the two or more segments 172, a range of the join column B of a next stage is identified regarding the segment 172, and subsequent S502 is performed.

(S502) Next, the filter creation unit 130 searches the column range index 173A corresponding to the join column A of a current stage by using a range (minimum value and maximum value) identified in S501. The filter creation unit 130 identifies the segment 172 having the values included in the foregoing range regarding the join column A of a current stage. According to the example shown in FIG. 5, the identified segments 172 are segment 5 and segment 6. This is because the column A range of segment 5 at least partially overlaps with the column B range of segment 5 (column B range identified in S501), and, similarly, the column A range of segment 6 at least partially overlaps with the column B range of segment 5.

(S503) The filter creation unit 130 creates a filter 400 describing the segment IDs of all segments 172 identified in S502. This filter 400 is used in an inner table scan of a next stage.

In creating a filter, the unit of an inner table scanning range may not be a segment unit.

Specifically, for example, when the number of segments 172 identified in S502 regarding the join column A of a current stage is small as shown in FIG. 6A, the filter creation unit 130 describes the segment ID of each segment 172 identified in S502 in the filter 400 (that is, the unit of an inner table scanning range is the segment 172). Note that the expression "number of the identified segments 172 is small" may mean satisfying at least (a2) of (a1) and (a2) below.

(a1) The total number of segments 172 identified in S502 is less than a threshold X regarding the join column A of a current stage.

(a2) The number of segments 172 identified in S502 is less than a threshold Y1 regarding each of one or more chunks 171 including the one or more segments 172 identified in S502 regarding the join column A of a current stage. The threshold Y1 may be prescribed based on the number of segments 172 of the chunk 171. The threshold Y1 may be common for all chunks 171, or may be different depending on the chunk 171.

Moreover, for example, when the number of segments 172 identified in S502 regarding the join column A of a current stage is medium as shown in FIG. 6B, the filter creation unit 130 describes the chunk ID of the chunk 171 including each segment 172 identified in S502 in the filter 400 (that is, the unit of an inner table scanning range is the chunk 171). In the foregoing case, the unit of determination of an inner table scanning range in a join of a next stage is the chunk 171 that is larger than the segment 172 and, therefore, the processing performance of a join can be improved. Note that the expression "number of the identified segments 172 is medium" may mean satisfying at least (b2) of (b1) and (b2) below.

(b1) The total number of segments 172 identified in S502 is less than a threshold X regarding the join column A of a current stage.

(b2) The number of segments 172 identified in S502 is equal to or greater than a threshold Y1 and equal to or smaller than a threshold Y2 regarding each of one or more chunks 171 including the one or more segments 172 identified in S502 regarding the join column A of a current stage. The threshold Y2 may be prescribed based on the number of segments 172 of the chunk 171 as with the threshold Y1, and may also be common for all chunks 171 or different depending on the chunk 171. For example, the threshold Y2 may be the same value as the total number of segments 172 configuring the chunk 171.

Moreover, for example, when the number of segments 172 identified in S502 regarding the join column A of a current stage is large as shown in FIG. 6C, the filter creation unit 130 does not need to designate an inner table scanning range in the filter 400 (for example, does not need to create the filter 400). In the foregoing case, while the determination of an inner table scanning range may become the overhead of processing, in this embodiment, it is possible to avoid such overhead. Note that the expression "number of the identified segments 172 is large" may mean that the total number of segments 172 identified in S502 is equal to or greater than a threshold X1 regarding the join column A of a current stage, the number of chunks 171 that need to be checked in chunk units (for example, chunks 171 in which the number of segments 172 identified in S502 is equal to or greater than a fixed ratio relative to the total number of segments of the chunk 171) is equal to or greater than a threshold X2, or the ratio of the number of chunks 171 that need to be checked related to the number of all chunks is equal to or greater than a threshold X3. At least one among the thresholds X1 to X3 may be prescribed based on the total number of segments 172 of the table (or the total number of chunks 171 of the table).

As described above, in this embodiment, the unit of an inner table scanning range is not fixed to the segments 172. The filter 400 may describe a chunk ID in substitute for or in addition to the segment ID. To put it differently, the segment ID and the chunk ID may coexist in the filter 400.

FIG. 7 shows a flow of the query processing according to the first embodiment.

In the query processing as processing that is performed in response to a recursive query, recursive join processing is performed. In the recursive join processing, the query execution unit 113 determines whether there is an outer table (S701). If there is no outer table, the query execution unit 113 ends the recursive join processing. If there is an outer table, the query execution unit 113 performs the following processing for performing a join of the outer table and the inner table.

The query execution unit 113 determines whether S703 was performed regarding each segment 172 of the inner table (S702).

When S703 has been performed regarding all segments 172 of the inner table, the query execution unit 113 sets a join result of a current stage in the outer table of a next stage (S711). The processing thereafter returns to S701. When there is no join result of a current stage, S711 is skipped, and the processing returns to S701.

If there is a segment 172 that has not yet undergone S703 in the inner table, the query execution unit 113 determines whether the segment 172 of the inner table is represented in the filter 400 (S703). The expression "segment 172 of the inner table is represented in the filter 400" means that a filter 400 exists, and the segment ID of the segment 172 or the chunk ID of the chunk including the segment 172 is described in the filter 400. In other words, the unit of determination of S703 (determination of the inner table scanning range) is the segment 172 or the chunk 171. When the determination result of S703 is false (S703: No), the processing returns to S702.

When the determination result of S703 is true (S703: Yes), the query execution unit 113 determines whether the values (data) have been read from all records of the segment 172 (S704). When the values have been read from all records of the segment 172, the processing returns to S702.

If there are records from which values have not yet been read in the corresponding segment 172, the query execution unit 113 reads the values from one record (for example, top record) among such records, and determines whether the filter creation flag is "ON" (S705). When the determination result of S705 is false (S705: No), S706 to S709 are skipped, and S710 is performed.

When the determination result of S705 is true (S705: Yes), the query execution unit 113 determines whether a first record of the segment 172 is a hit record (S706). When the determination result of S706 is false (S706: No), S707 to S709 are skipped, and S710 is performed.

When the determination result of S706 is true (S706: Yes), the filter creation unit 130 identifies a range (minimum value and maximum value) of the corresponding segment 172 from the column range index 173 of a join column of a next stage (S707). The filter creation unit 130 identifies the segment 172 having a range that at least partially overlaps with the range identified in S707 from the column range index 173 of a join column of a current stage (S708). The filter creation unit 130 performs the next stage filter creation processing (S709). The query execution unit 113 performs the join processing with the outer table using the values read from the read source record (S710). The processing thereafter returns to S704.

Figure 8:
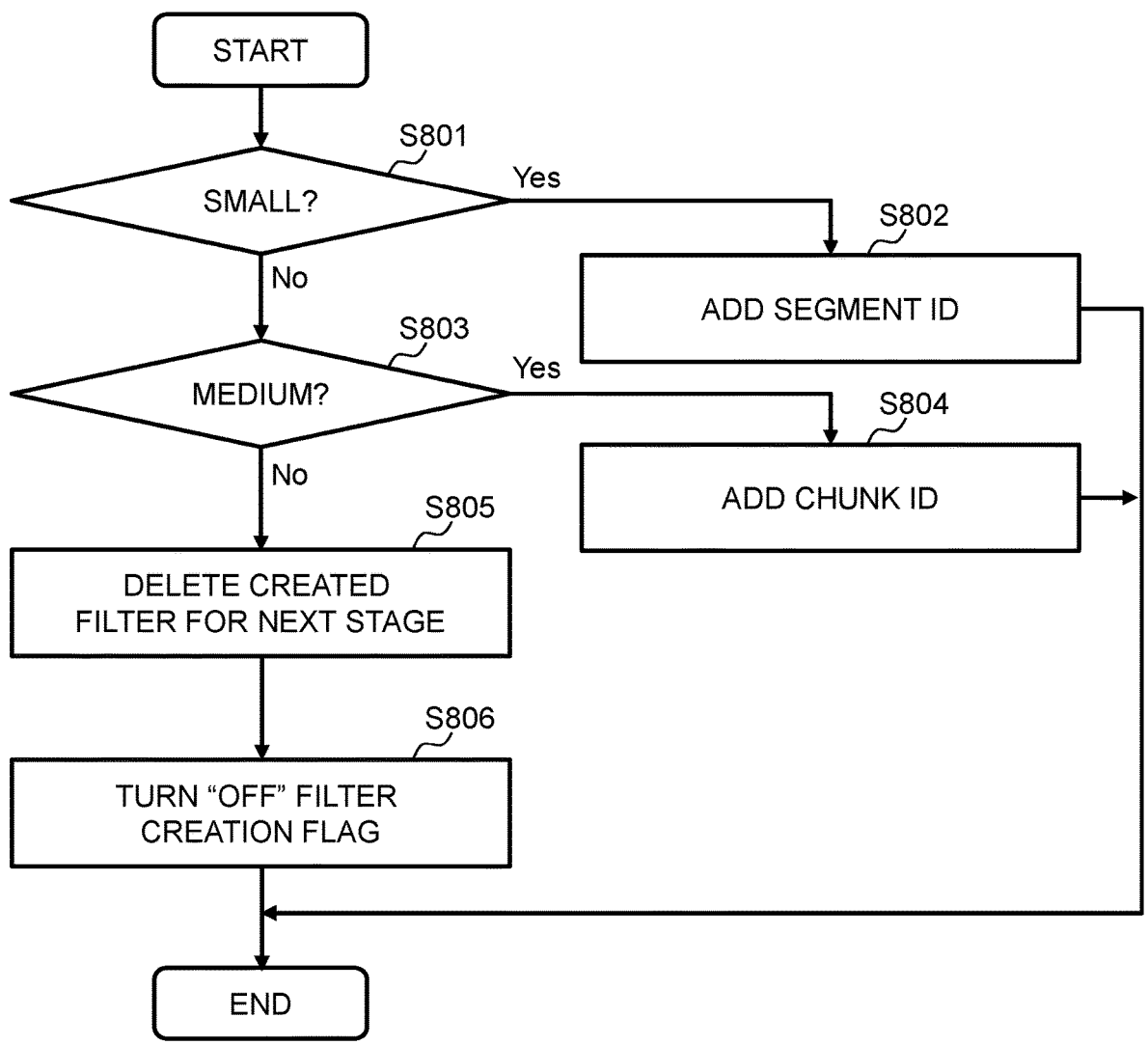
FIG. 8 shows a flow of the next stage filter creation processing.

FIG. 8 shows a flow of the next stage filter creation processing (S709 of FIG. 7).

The filter creation unit 130 determines whether the number of segments 172 identified in S708 is small (S801). When the determination result of S801 is true (S801: Yes), the filter creation unit 130 adds the segment ID of the segments 172 identified in S708 to the filter 400 (S802).

When the determination result of S801 is false (S801: No), the filter creation unit 130 determines whether the number of segments identified in S707 is medium (S803). When the determination result of S803 is true (S803: Yes), the filter creation unit 130 adds the chunk ID of the chunk 171 including the segments 172 identified in S708 to the filter 400 (S804).

When the determination result of S803 is false (S803: No), the filter creation unit 130 deletes the filter 400 that has been created for the next stage (S805), and turns "OFF" the filter creation flag (S806).

Figure 9:
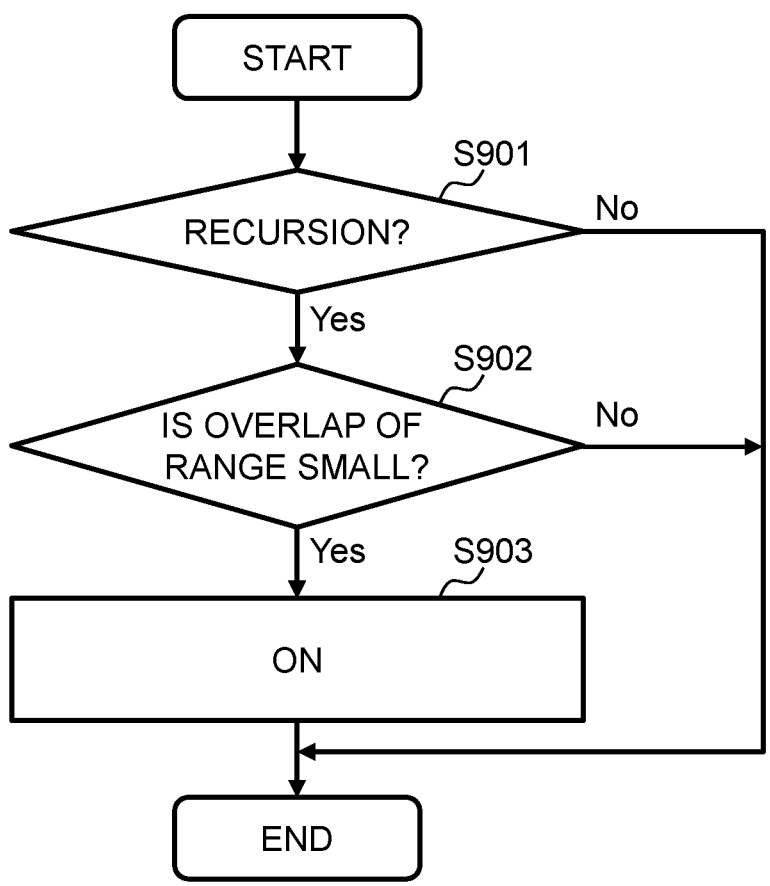
FIG. 9 shows a flow of the creation determination processing according to the first embodiment.

FIG. 9 shows a flow of the creation determination processing according to the first embodiment. The creation determination processing needs to be performed before the start of each stage (provided that S901 may be performed once before the start of the query processing in response to the recursive query (processing including the processing shown in FIG. 7)).

The creation determination unit 120 determines whether the received query is a recursive query (S901).

When the determination result of S901 is true (S901: Yes), the creation determination unit 120 determines whether the overlap of ranges is small based on the column range index 173 of each column (S902). The expression "overlap of ranges of segments" may be the values related to the statics of the overlap of ranges between the segments for each column, and the expression "overlap of ranges of the segments 172 is small" may mean that a value related to such statistics is a threshold or less. Note that the information of such statistics may be input from the outside of the database management apparatus 100, or the DBMS 110 may acquire the information of such statistics at some point in time before the start of the query processing.

When the determination result of S902 is true (S902: Yes), the creation determination unit 120 turns "ON" the filter creation flag (S903).

This ends the explanation of the first embodiment.

Second Embodiment

The second embodiment is now explained. Here, differences from the first embodiment will be mainly explained, and the explanation of points that are common with the first embodiment will be omitted or simplified.

In the second embodiment, the join processing is the multistage join processing that is performed according to a multistage join query.

Figure 10:
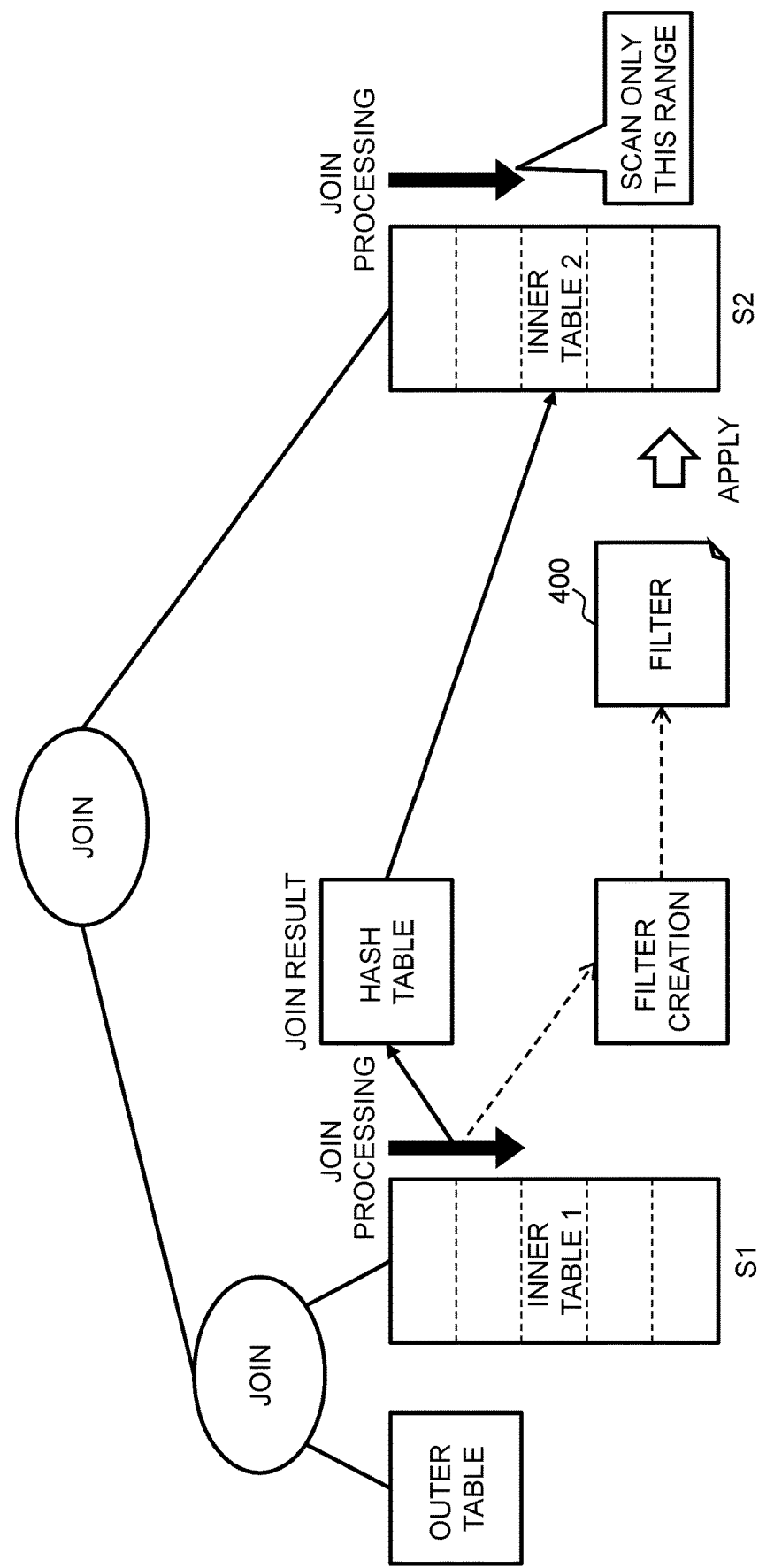
FIG. 10 shows an example of the multistage join processing according to the second embodiment.

FIG. 10 shows an example of the multistage join processing.

When creating a hash table and subsequently performing a join of a next stage in the multistage join processing (hash join), the filter creation unit 130 creates a filter 400 for an inner table scan of a join of a next stage when implementing the join processing of a previous stage. In a join of a next stage, a hash table as a result of a join of a previous stage is the outer table. The query execution unit 113 scans, in a join of an outer table and an inner table (join of a next stage), only a range represented with the filter 400 in an inner table.

Figure 11:
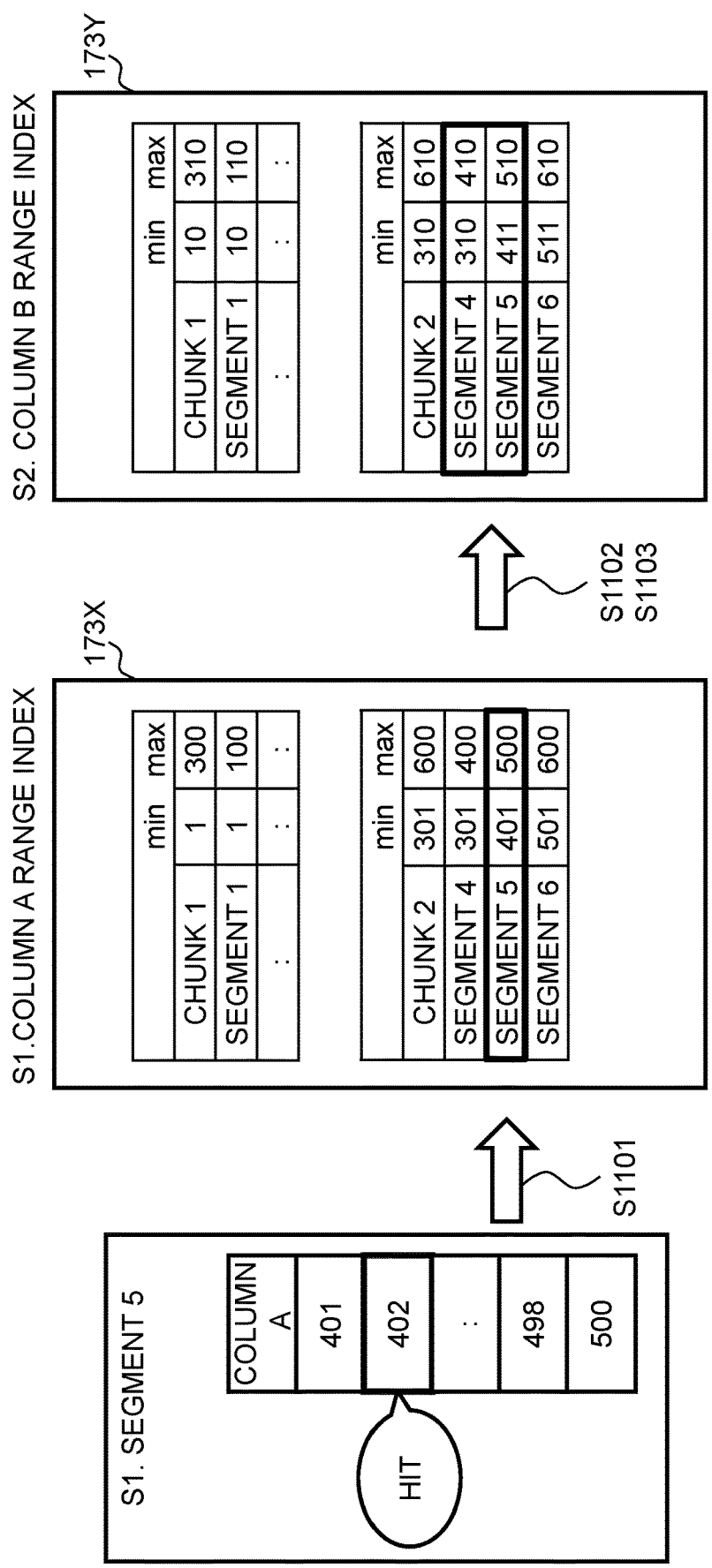
FIG. 11 shows an example of the filter creation in the multistage join processing.

FIG. 11 shows an example of the filter creation in the multistage join processing.

According to the example shown in FIG. 11, a join condition is S1.column A=S2.column B (S1 and S2 are each an inner table). There are a column range index 173X of a join column (S1A) of a current stage and a column range index 173Y of a join column (S2B) of a next stage.

In the example shown in FIG. 11, the filter creation unit 130 performs the following processing.

(S1101) When there is a hit record in an inner table scan related to the join column S1A of a current stage, the filter creation unit 130 identifies a range (minimum value and maximum value) of a join column of a current stage from the column range index 173X of the join column S1A of a current stage regarding the segment 172 including the hit record. According to the example shown in FIG. 11, the "segment 172 including the hit record" is segment 5, and, in a "range of the join column S1A of a current stage", the minimum value is "401" and the maximum value is "500". When a hit record exists in each of the two or more segments 172, a range of the join column of a current stage is identified regarding the segment 172, and subsequent S1102 is performed.

(S1102) Next, the filter creation unit 130 searches the column range index 173Y corresponding to the join column S2B of a next stage by using a range (minimum value and maximum value) identified in S1101. The filter creation unit 130 identifies the segment 172 having the values included in the foregoing range regarding the join column S2B of a next stage. According to the example shown in FIG. 11, the identified segments 172 are segment 4 and segment 5. This is because the column S1B range of segment 4 at least partially overlaps with the column S1A range of segment 5 (range identified in S501), and, similarly, the column S1B range of segment 5 at least partially overlaps with the column S1A range of segment 5.

(S1103) The filter creation unit 130 creates a filter 400 describing the segment IDs of all segments 172 identified in S1102. This filter 400 is used in an inner table scan of a next stage. Note that the chunk IDs may be described instead of the segment IDs depending on the number of segments 172 identified in S1102.

Figure 12:
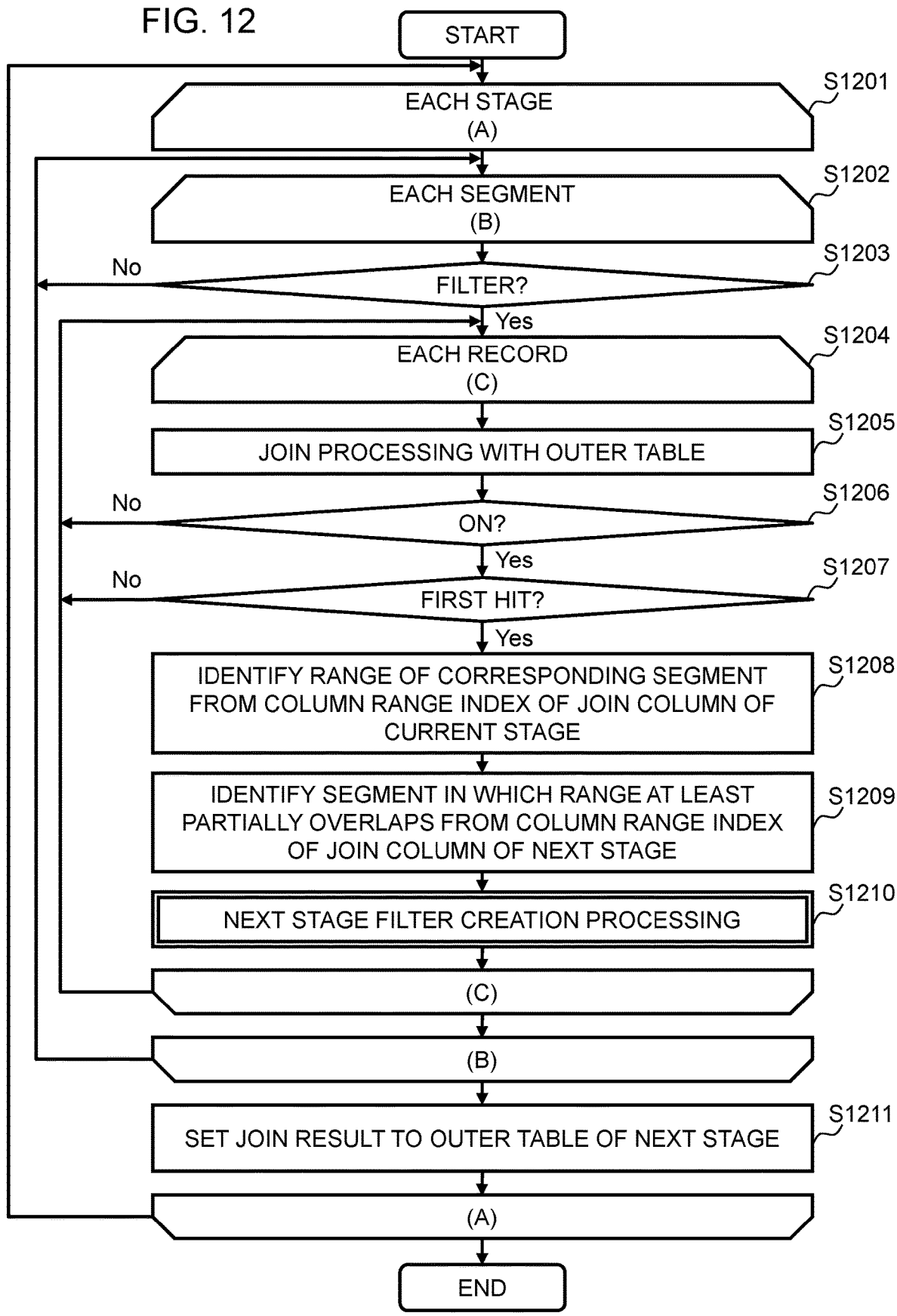
FIG. 12 shows a flow of the query processing according to the second embodiment.

FIG. 12 shows a flow of the query processing according to the second embodiment.

In the query processing as processing that is performed in response to a multistage join query, multistage join processing is performed. In the multistage join processing, the query execution unit 113 determines whether a join of all stages according to the multistage join query has been completed (S1201). When a join of all stages has been completed, the query execution unit 113 ends the multistage join processing. If there is any stage in which a join has not been performed, the query execution unit 113 performs the following processing.

The query execution unit 113 determined whether S1203 was performed regarding each segment 172 of the inner table (S1202).

When S1203 has been performed regarding all segments 172 of the inner table, the query execution unit 113 sets a join result of a current stage in the outer table of a next stage (S1211). The processing thereafter returns to S1201.

If there is a segment 172 that has not yet undergone S1203 in the inner table, the query execution unit 113 determines whether the segment 172 of the inner table is represented in the filter 400 (S1203). When the determination result of S1203 is false (S1203: No), the processing returns to S1202.

When the determination result of S1203 is true (S1203: Yes), the query execution unit 113 determines whether the values (data) have been read from all records of the segment 172 (S1204). When the values have been read from all records of the segment 172, the processing returns to S1202.

If there are records from which values have not yet been read in the corresponding segment 172, the query execution unit 113 reads the values from one record (for example, top record) among such records, and performs join processing with the outer table using such values (S1205). The query execution unit 113 determines whether the filter creation flag is "ON" (S1206). When the determination result of S1206 is false (S1206: No), S1207 to S1210 are skipped, and the processing returns to S1204.

When the determination result of S1206 is true (S1206: Yes), the query execution unit 113 determines whether a first record of the segment 172 is a hit record (S1207). When the determination result of S1207 is false (S1207: No), S1208 to S1210 are skipped, and the processing returns to S1204.

When the determination result of S1207 is true (S1207: Yes), the filter creation unit 130 identifies a range (minimum value and maximum value) of the corresponding segment 172 from the column range index 173 of a join column of a current stage (S1208). The filter creation unit 130 identifies the segment 172 having a range that at least partially overlaps with the range identified in S1208 from the column range index 173 of a join column of a next stage (S1209). The filter creation unit 130 performs the next stage filter creation processing (FIG. 8) (S1210).

This ends the explanation of the second embodiment. Note that, in the creation determination processing according to the second embodiment, the determination of S901 of FIG. 9 is the determination of whether the received query is a multistage join query instead of the determination of whether the received query is a recursive query. When the result of this determination is true, S902 and S903 are performed. Moreover, while the determination of whether the received query is a multistage join query only needs to be performed once before the start of the query processing that is performed in response to the multistage join query (processing including the processing shown in FIG. 12)), S902 needs to be performed before the start of each stage.

The foregoing explanation can be summarized, for instance, in the following manner. The following summary may include a supplementary explanation or an explanation of modified examples.

A database management apparatus 100 comprises a query reception unit 111 which receives a query of a database 141 stored in an external storage apparatus 140 (example of a storage apparatus), a query execution unit 113 which executes query processing as processing in response to the query, and a filter creation unit 130 which creates a filter as data representing a scanning range of an inner table. The external storage apparatus 140 stores a column range index as data representing a range of values stored in a table. The query processing is processing in which join processing including a join of multiple stages is performed. When a join result of a current stage is an outer table related to a join of a next stage in a join of each stage of the join processing, the filter creation unit 130 performs filter creation processing. The query execution unit 113 scans only a range represented with a filter 400 created in the filter creation processing within an inner table related to the join of the next stage. The filter creation processing identifies whether there is a possibility that an inner table related to a join of a next stage includes a hit record in an inner table related to a join of a current stage based on a column range index corresponding to a join column of a current stage and a column range index corresponding to a join column of a next stage. Consequently, the scanning range of an inner table can be limited in the join processing irrespective of the existence of search conditions or a partition key, and the performance of the join processing can be improved.

A table 151 in the database 141 may be configured from a plurality of segments 172. Each of the plurality of segments 172 may be a unit that is larger than a record, may be configured from two or more records within the table 151, and may include a plurality of columns of the table 151. In the external storage apparatus 140, the column range index may exist for each segment 172. Each column range index may represent a range of values stored in the segment 172 corresponding to the column range index.

The filter creation processing may additionally include identifying a segment 172 having a range that at least partially overlaps with a range of a segment 172 including a hit record in an inner table related to a join of a current stage based on a column range index 173 (for example, 173A or 173X) corresponding to a join column of a current stage and a column range index column range index 173 (for example, 173B or 173Y) corresponding to a join column of a next stage, and adding data representing the identified segment 172 to the filter 400.

As described above, while an inner table scanning range of a next stage is described in the filter 400, the inner table scanning range may be a segment 172 that is larger than a record. Thus, in a join of a next stage, the unit of determining the inner table scanning range is a segment 172 that is larger than a record and, therefore, the processing performance of a join can be improved. Moreover, since the segment 172 as the inner table scanning range of a next stage can be identified based on the column range index 173 of a join column of a current stage and a join column of a next stage, the scanning range of an inner table can be limited in the join processing irrespective of the existence of search conditions or a partition key. Note that, when there is a possibility that an inner table related to a join of a next stage includes a hit record in an inner table related to a join of a current stage, the filter creation processing may additionally determine to implement scanning of an inner table related to a join of a next stage. When the implementation of scanning of an inner table related to the join of the next stage is determined, the query execution unit 113 may scan only a range represented with the filter 400 created in the filter creation processing.

The filter creation unit 130 may perform the filter creation processing when the segment 172 includes a first hit record. It is thereby possible to avoid the needlessness of performing segment identification and filter creation processing (for example, S707 to S709 or S1208 to S1210) regarding the same segment 172 each time that a hit record appears for the same segment 172, and this can contribute to the improvement in the performance of the join processing.

The database management apparatus 100 may further comprise a creation determination unit 120. The creation determination unit 120 may perform, when the query processing includes the join processing including a join of a multiple stages, creation determination where the query processing determines (A) whether an overlap of ranges between segments in each column is small, or (B) whether an application using the values stored in the database is a prescribed application. The filter creation unit 130 may perform the filter creation processing when the result of the creation determination is true (for example, when the filter creation flag is "ON"). It is thereby possible to avoid creating a filter 400 when the effect of limiting the scanning range of the inner table is small due to the numerous overlapping ranges between the segments in a column.

An example of the creation determination (A) may be as follows. In other words, the creation determination unit 120 may confirm the distribution of ranges of each segment for each column based on the column range index 173 of each column, and determine whether the overlap of ranges is small. When it is determined that the overlap of ranges is small for all columns that could become a join column in the join processing, the result of the creation determination may be true (for example, filter creation flag is "ON").

Figure 13:
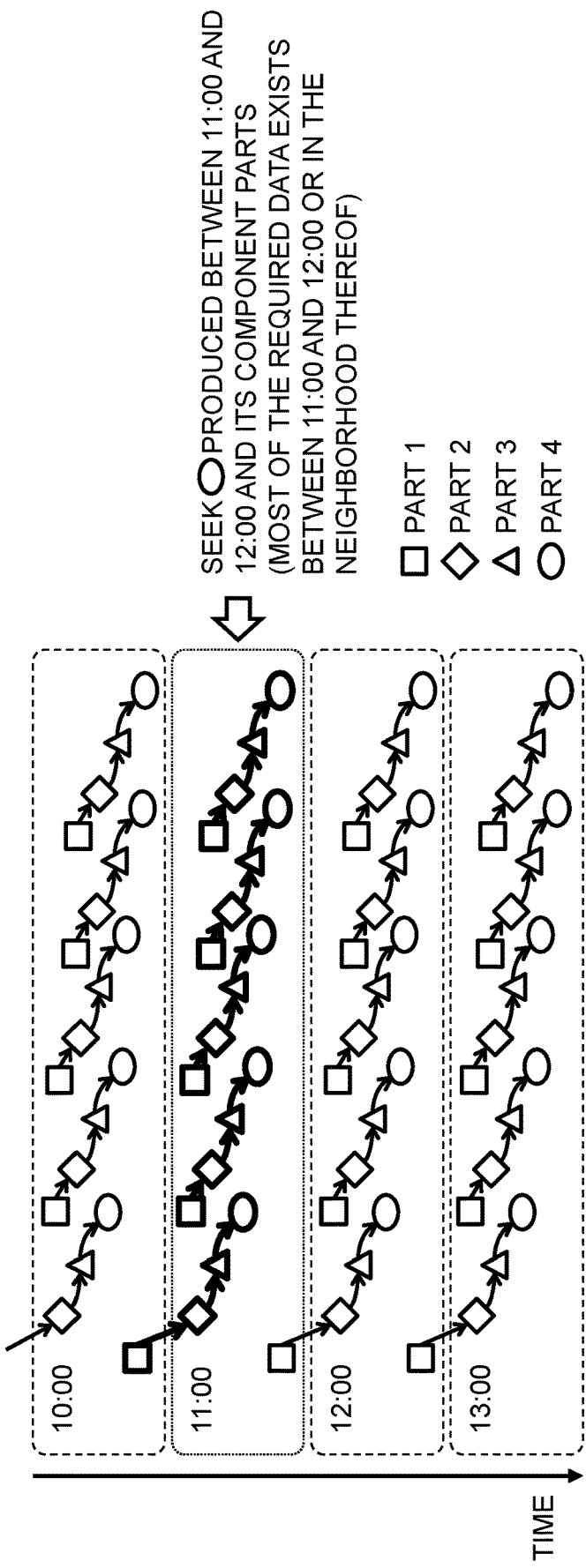
FIG. 13 shows an example of the data structure where limiting the scanning range of the inner table would be useful in the first or second embodiment.

An example of the creation determination (B) may be as follows. In other words, a "prescribed application" may be any type of application as a database in which the overlap of ranges in each column is expected to be small. As this kind of application, for example, there is an industrial application as shown in FIG. 13. A database related to an industrial application (for example, production of parts) is often a graph structure data. For example, the parts are close to each other in terms of time, and data of the recursive destination is also close in terms of time in the database. In an industrial application, the processing (traverse) that follows the graph structure data is one of the key search patterns. A recursive query may be used for traversing the graph structure data. In a recursive query, the join processing of data (original data) extracted from a history table (inner table) and data of a different part of the history table may be repeatedly performed. In this kind of join processing, only the part related to the original data is scanned, performance of the join processing is improved and, therefore, the shortening of the traverse time of the graph structure data can be expected.

The table 151 may be configured from a plurality of chunks 171, Each chunk 171 may be configured from two or more segments 172. The filter creation unit 130 may select a scan unit to be a segment 172, a chunk 171 or an overall inner table according to a number of the identified segments 172, and update the filter 400 or not create the filter 400 according to the selected scan unit. The further improvement in the performance of the join processing can thereby be expected.

Specifically, for example, the scan unit may be a segment when a number of the identified segments satisfies a condition that a number of segments is small. The scan unit may be a chunk when a number of the identified segments satisfies a condition that a number of segments is medium. The scan unit may be an overall inner table when a number of the identified segments satisfies a condition that a number of segments is large. It is thereby possible to cause the scan unit to be an appropriate size, such as a segment or a chunk, according to the number of segments, or avoid the creation of the filter 400 from becoming an overhead depending on the number of segments.

The join processing may be recursive join processing. The filter creation processing may include identifying a range of a segment 172 including a hit record in an inner table related to a join of a current stage from a column range index 173B corresponding to a join column of a next stage (for example, S501 or S707), identifying a segment 172 having a range that at least partially overlaps with the identified range from a column range index 173A corresponding to a join column of a current stage (for example, S502 or S708), and adding data representing the identified segment (for example, segment ID or chunk ID) to the filter (for example, S503 or S709). Performance of the recursive join processing can thereby be improved.

The join processing may be multistage join processing. The filter creation processing may include identifying a range of a segment 172 including a hit record in an inner table related to a join of a current stage from a column range index 173X corresponding to a join column of a current stage (for example, S1101 or S1208), identifying a segment 172 having a range that at least partially overlaps with the identified range from a column range index 173Y corresponding to a join column of a next stage (for example, S1102 or S1209), and adding data representing the identified segment 172 to the filter (for example, S1103 or S1210). Performance of the multistage join processing can thereby be improved.

While several embodiments of the present invention were described above, the foregoing embodiments are illustrations for explaining the present invention, and are not intended to limit the scope of the present invention only to the foregoing embodiments. The present invention can also be worked in various other modes.

The invention claimed is:

1. A database management apparatus, comprising:
 a processor which when executing a program configures the processor to:
 receive a query of a database stored in a storage apparatus;
 execute query processing as processing in response to the query; and
 create a filter as data representing a scanning range of an inner table, wherein
 the storage apparatus stores a column range index as data representing a range of values stored in a table in the database,
 the query processing is processing in which join processing including a join of multiple stages is performed,
 when a join result of a current stage is an outer table related to a join of a next stage in a join of each stage of the join processing,
 the processor performs filter creation processing,
 the processor scans only a range represented with the filter created in the filter creation processing within an inner table related to the join of the next stage,
 the filter creation processing identifies whether there is a possibility that an inner table related to a join of a next stage includes a hit record in an inner table related to a join of a current stage based on a column range index corresponding to a join column of a current stage and a column range index corresponding to a join column of a next stage,
 the table in the database is configured from a plurality of segments,
 each of the plurality of segments is a unit that is larger than a record, is configured from two or more records within the table, and includes a plurality of columns of the table,
 the column range index exists for each segment,
 each column range index is data representing a range of values stored in a column of a segment corresponding to the column range index, and
 the filter creation processing additionally includes:
 identifying a segment having a range that at least partially overlaps with a range of a segment including a hit record in an inner table related to a join of a current stage based on a column range index corresponding to a join column of a current stage and a column range index corresponding to a join column of a next stage; and
 adding data representing the identified segment to the filter.

2. The database management apparatus according to claim 1, wherein:

when there is a possibility that an inner table related to a join of a next stage includes a hit record in an inner table related to a join of a current stage, the filter creation processing additionally determines to implement scanning of an inner table related to a join of a next stage.

3. The database management apparatus according to claim 1, wherein:
the processor is further configured to perform the filter creation processing when a segment includes a first hit record.

4. The database management apparatus according to claim 1, wherein the processor is further configured to:
when the query processing includes the join processing including the join of the multiple stages, perform creation determination where the query processing determines whether an overlap of ranges between segments in each column is small, or whether an application using the values stored in the database is a prescribed application; and
perform the filter creation processing when a result of the creation determination is true.

5. The database management apparatus according to claim 1, wherein:
the table in the database is configured from a plurality of chunks;
each chunk is configured from two or more of the plurality of segments; and
the processor is further configured to select a scan unit to be a segment, a chunk or an overall inner table according to a number of the identified segments, and update the filter or does not create the filter according to the selected scan unit.

6. The database management apparatus according to claim 5, wherein:
the scan unit is a segment when a number of the identified segments satisfies a condition that a number of segments is small;
the scan unit is a chunk when a number of the identified segments satisfies a condition that a number of segments is medium; and
the scan unit is an overall inner table when a number of the identified segments satisfies a condition that a number of segments is large.

7. The database management apparatus according to claim 1, wherein:
the join processing is recursive join processing; and
the filter creation processing includes:
identifying a range of a segment including a hit record in an inner table related to a join of a current stage from a column range index corresponding to a join column of a next stage;
identifying a segment having a range that at least partially overlaps with the identified range from a column range index corresponding to a join column of a current stage; and
adding data representing the identified segment to the filter.

8. The database management apparatus according to claim 1, wherein:
the join processing is multistage join processing; and
the filter creation processing includes:
identifying a range of a segment including a hit record in an inner table related to a join of a current stage from a column range index corresponding to a join column of a current stage;
identifying a segment having a range that at least partially overlaps with the identified range from a column range index corresponding to a join column of a next stage; and
adding data representing the identified segment to the filter.

9. The database management apparatus according to claim 1, wherein the processor is further configured to:
when the query processing includes the join processing including the join of the multiple stages, perform creation determination of determining whether an application using the values stored in the database is a prescribed application; and
perform the filter creation processing when a result of the creation determination is true.

10. A database management method, comprising the steps of:
when query processing as processing in response to a query of a database stored in a storage apparatus is processing in which join processing including a join of multiple stages and a join result of a current stage is an outer table related to a join of a next stage in a join of each stage of the join processing,
performing filter creation processing; and
scanning only a range represented with the filter created in the filter creation processing within an inner table related to the join of the next stage, wherein
the storage apparatus stores a column range index as data representing a range of values stored in a table in the database,
the filter is data representing a scanning range of an inner table,
the filter creation processing identifies whether there is a possibility that an inner table related to a join of a next stage includes a hit record in an inner table related to a join of a current stage based on a column range index corresponding to a join column of a current stage and a column range index corresponding to a join column of a next stage,
the table in the database is configured from a plurality of segments,
each of the plurality of segments is a unit that is larger than a record, is configured from two or more records within the table, and includes a plurality of columns of the table,
the column range index exists for each segment,
each column range index is data representing a range of values stored in a column of a segment corresponding to the column range index, and
the filter creation processing additionally includes:
identifying a segment having a range that at least partially overlaps with a range of a segment including a hit record in an inner table related to a join of a current stage based on a column range index corresponding to a join column of a current stage and a column range index corresponding to a join column of a next stage; and
adding data representing the identified segment to the filter.

11. A non-transitory computer-readable medium storing a computer program for causing a computer to:
when query processing as processing in response to a query of a database stored in a storage apparatus is processing in which join processing including a join of multiple stages and a join result of a current stage is an outer table related to a join of a next stage in a join of each stage of the join processing, perform filter creation processing; and scan only a range represented with the filter created in the filter creation processing within an inner table related to the join of the next stage, wherein the storage apparatus stores a column range index as data representing a range of values stored in a table in the database, the filter is data representing a scanning range of an inner table, the filter creation processing identifies whether there is a possibility that an inner table related to a join of a next stage includes a hit record in an inner table related to a join of a current stage based on a column range index corresponding to a join column of a current stage and a column range index corresponding to a join column of a next stage, the table in the database is configured from a plurality of segments, each of the plurality of segments is a unit that is larger than a record, is configured from two or more records within the table, and includes a plurality of columns of the table, the column range index exists for each segment, each column range index is data representing a range of values stored in a column of a segment corresponding to the column range index, and the filter creation processing additionally includes:

identifying a segment having a range that at least partially overlaps with a range of a segment including a hit record in an inner table related to a join of a current stage based on a column range index corresponding to a join column of a current stage and a column range index corresponding to a join column of a next stage; and adding data representing the identified segment to the filter.

\* \* \* \* \*